J. McLELLAN.
COMBINED SEPARABLE COLLAR AND FASTENING MEANS THEREFOR.
APPLICATION FILED APR. 2, 1913.
1,081,273. Patented Dec. 9, 1913.
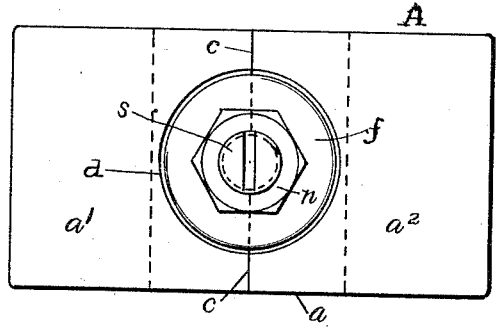
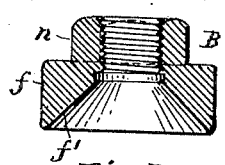
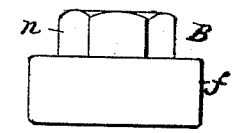
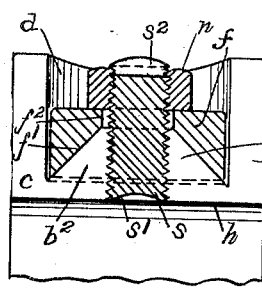
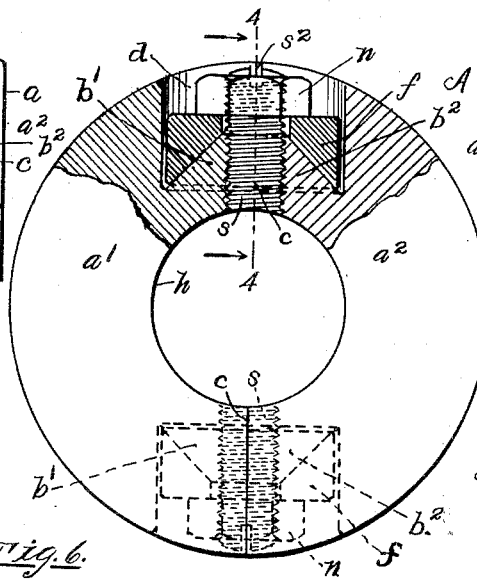
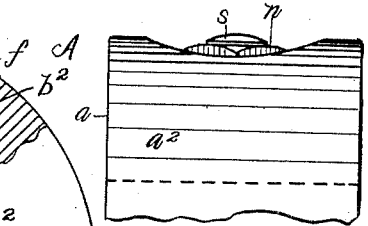
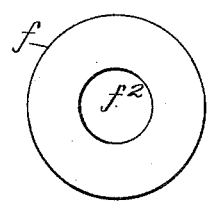
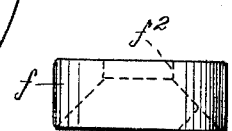
Witnesses.
Inventor.
John McLellan.
By Geo. H. Remington,
Atty.
COLUMBIA PLANOGRAPH CO., WASHINGTON, D. C.

UNITED STATES PATENT OFFICE.

JOHN McLELLAN, OF PROVIDENCE, RHODE ISLAND, ASSIGNOR OF ONE-HALF TO WILLIAM A. MILLARD, JR., OF PROVIDENCE, RHODE ISLAND.

COMBINED SEPARABLE COLLAR AND FASTENING MEANS THEREFOR.

1,081,273.   Specification of Letters Patent.   Patented Dec. 9, 1913.

Application filed April 2, 1913. Serial No. 758,364.

*To all whom it may concern:*

Be it known that I, JOHN MCLELLAN, a citizen of the United States, residing at Providence, in the county of Providence and State of Rhode Island, have invented certain new and useful Improvements in Combined Separable Collars and Fastening Means Therefor, of which the following is a specification.

My invention relates to a combined split-collar and fastening device for shafting, etc., and it consists in the novel construction and arrangement of its parts, as hereinafter set forth and claimed.

The primary object of the invention is to provide separable metal collars with simple and inexpensive means for detachably fastening or clamping the two halves of the collar together, the said fastening means being also adapted to rigidly secure the collar in place on the shaft and at the same time lock it in position against accidental loosening and displacement.

In the accompanying drawing, Figure 1 represents a front elevation, in partial section, of a split or separable collar, complete, provided with my invention; Fig. 2 is a top plan view corresponding with Fig. 1; Fig. 3 is a partial side elevation, viewed from the right of Fig. 1; Fig. 4 is a partial transverse sectional view, taken on line 4—4 of Fig. 1; Fig. 5 is a side elevation of the clamping washer member, detached from the collar; Fig. 6 is a corresponding top plan view of it; and Figs. 7 and 8 show a modification.

The following is a description of my invention and the manner of its operation: The centrally separable collar proper and the fastening means coöperable therewith, substantially as shown in Figs. 1 and 2, constitute an article of manufacture, indicated by A. The meeting or contiguous surfaces $c$, $c$ of the two halves $a^1$, $a^2$ of the transversely divided collar member $a$ are faced off true and smooth; the other surfaces of the collar are suitably machined, including the boring of the center hole $h$, the latter corresponding to the diameter of the shaft on which the collar is to be fixed. At diametrically opposite points where the said center faces $c$, $c$ of the collar $a$ engage each other, being the plane of separation on the median line, the collar is counterbored radially from its outer circumference to form a comparatively large recess $d$, each recess having a central cone-like clamping member extending outward from the base of the cavity. The axes of the two cones and recesses are in alinement and disposed at right angles to the longitudinal axis of the said center hole $h$. Each cone-shaped member is divided axially; one-half, $b^1$, being integral with the part $a^1$ of the collar, the other half, $b^2$, adapted to coöperate with part $b^1$, being integral with the corresponding collar part $a^2$. The two halves of the collar are temporarily held together by suitable means, and tapped to receive set-screws $s$; the screw-threaded portion extends inward through the cone and into the bore $h$. Obviously, the hole tapped to receive the said set-screw has one-half of the screw-thread cut in each half thereof—see Fig. 4. Owing to the presence of the said central screw-threaded hole, the cone becomes, in fact, truncated.

An integral, relatively thick metal collar or clamping washer member $f$ is employed in connection with the cone-frustum $b^1$, $b^2$ and superimposed thereon; the washer member $f$ has a recess or cavity provided with inclined or converging surfaces $f^1$ forming the counterpart of the said cone and adapted to frictionally engage therewith. A central aperture $f^2$ in the washer permits the screw $s$ to freely pass therethrough to engage the relatively stationary cone-like members in the corresponding recess $d$. The lower ends of screws $s$ may be cupped, as at $s^1$, Fig. 4, if desired, and having the opposite ends adapted to receive a suitable tool, as for example, the blade of a screwdriver, whereby the screws may be manipulated; $s^2$ indicating a nick or slot for the purpose. A nut $n$ is fitted to the screw and, when in use, bears snugly against the outer face of the member $f$.

The operation is substantially as follows: The two halves $a^1$, $a^2$ of the disassembled device A are first placed to encircle a shaft of the proper size, followed by placing the clamping member $f$ in approximate position over the respective cone-shaped members of the sockets or recesses $d$, then inserting the inner or lower portions of the nut-carrying screws $s$ through the members $f$ to engage the screw-threaded portions of the main collar $a$, followed by turning the nuts $n$ in the proper direction until they engage the adjacent faces of the washers $f$, thereby forcing the faces c of the collar together into snug engagement and at the same time causing the beveled sides $f^1$ of the members $f$ to firmly engage the corresponding surfaces of the cones. The screws $s$ may be turned independently of the nuts to slightly embed the points thereof into the shaft's surface; the nuts then may be given a partial turn to lock or check the screws.

I am aware that various clamping devices have been employed for securing together the two halves of split collars, etc.; I disclaim such former clamping means. My device resides essentially in the employment of a split collar having its two halves interchangeably alike; the plane of separation being parallel and central with the longitudinal axis of the main bore extending centrally through the collar. The abutting faces of the two halves, $a^1$, $a^2$, are counterbored diametrically and having a centrally screw-tapped cone-like element, integral with the collar, formed at the base of each counterbore, a washer-like member $f$ having inclined inner sides fitting said cone surface is removably seated upon each cone part and maintained in place by a nut-carrying radial screw $s$ fitted to the screw-thread of the cone. The screw $s$ is adapted to be manipulated by suitable means, as for example, a screw-driver; the nut $n$ at substantially the same time being actuated to force or clamp the halves of the cone together through the interposed member $f$. The inner end of each screw is adapted to engage the shaft, for obvious purposes.

In Figs. 7 and 8, which represent a slightly modified construction, the nut and clamping washer members are integral with each other and designated by the letter B. The function of the head or nut portion $n$ and the enlarged annular base or washer part $f$ is substantially the same as hereinbefore stated; that is, the base part $f$ has a central opening having the counterpart of the cone frustum adapted, in connection with the manually operable screw $s$ and tapped head portion, to snugly engage said cone part for rigidly clamping together the adjacent ends of the sections $a^1$, $a^2$, of the collar. The thus modified members may be readily substituted and successfully employed in lieu of the corresponding members represented in the other figures.

I claim as my invention and desire to secure by United States Letters Patent:—

A laterally separable split collar, comprising a pair of centrally bored, oppositely disposed semi-circular main sections interchangeably alike, the meeting faces or joint portion of the semi-circular sections being radially counterbored with respect to the longitudinal axis of the collar, the base of each counterbore having a split cone-like member integral with the respective collar sections through which cone member radially extends a centrally tapped screw-threaded hole intersecting the main bore of the collar, an adjustably mounted screw fitting said tapped hole, a centrally apertured washer or clamping member superimposed upon said split cone-like member and snugly engaging its beveled sides, and a manually actuated nut adapted to operatively engage said screw and, when in normal use, for securing the collar in position on the shaft and at the same time further serving to snugly clamp the collar to the shaft.

In testimony whereof I have affixed my signature in presence of two witnesses.

JOHN McLELLAN.

Witnesses:
CALVIN H. BROWN,
GEO. H. REMINGTON.

---

Copies of this patent may be obtained for five cents each, by addressing the "Commissioner of Patents, Washington, D. C."